(12) United States Patent  
Pendergrass et al.

(10) Patent No.: US 8,038,555 B2  
(45) Date of Patent: Oct. 18, 2011

(54) ONE-WAY CLUTCHED DAMPER FOR AUTOMATIC BELT TENSIONER

(75) Inventors: Jeffrey A. Pendergrass, Williard, MO (US); Robert C. Joslyn, Christian County, MO (US)

(73) Assignee: Dayco Products, LLC, Miamisburg, OH (US)

( * ) Notice: Subject to any disclaimer, the term of this patent is extended or adjusted under 35 U.S.C. 154(b) by 314 days.

(21) Appl. No.: 11/514,135

(22) Filed: Aug. 31, 2006

(65) Prior Publication Data

US 2008/0058141 A1    Mar. 6, 2008

(51) Int. Cl.
*F16H 7/12* (2006.01)

(52) U.S. Cl. ...... 474/135; 188/82.4; 188/82.9; 474/131; 474/132; 474/133; 474/134; 474/136; 192/219.3

(58) Field of Classification Search .......... 474/131–145; 188/82.4, 82.9; 192/93 A, 12 B, 219.3
See application file for complete search history.

(56) References Cited

U.S. PATENT DOCUMENTS

| | | | | |
|---|---|---|---|---|
| 2,145,008 A * | 1/1939 | Jagersberger | ............ | 192/219.3 |
| 2,372,026 A * | 3/1945 | Smith | ............ | 188/82.84 |
| 2,569,108 A * | 9/1951 | Koch | ............ | 188/82.84 |
| 2,931,476 A * | 4/1960 | Zeidler et al. | ............ | 192/89.21 |
| 4,176,733 A * | 12/1979 | Twickler | ............ | 188/134 |
| 4,392,840 A * | 7/1983 | Radocaj | ............ | 474/117 |
| 4,415,072 A * | 11/1983 | Shoji et al. | ............ | 192/45 |
| 4,464,147 A * | 8/1984 | Foster | ............ | 474/135 |
| 4,557,709 A * | 12/1985 | St. John | ............ | 474/117 |
| 4,583,962 A | 4/1986 | Bytzek et al. | | |
| 4,596,538 A * | 6/1986 | Henderson | ............ | 474/135 |
| 4,822,322 A * | 4/1989 | Martin | ............ | 474/135 |
| 4,832,665 A | 5/1989 | Kadota et al. | | |
| 4,834,694 A * | 5/1989 | Martin | ............ | 474/135 |
| 4,886,482 A | 12/1989 | Koschmieder et al. | | |
| 4,923,435 A * | 5/1990 | Kadota et al. | ............ | 474/112 |
| 5,558,370 A | 9/1996 | Behr | | |
| 5,598,913 A * | 2/1997 | Monahan et al. | ............ | 192/41 S |
| 5,638,931 A * | 6/1997 | Kerr | ............ | 192/45 |
| 6,129,189 A * | 10/2000 | Kerr | ............ | 192/45 |
| 6,135,255 A * | 10/2000 | Myers | ............ | 192/45 |
| 6,231,465 B1 | 5/2001 | Quintus | | |
| 6,328,147 B1 * | 12/2001 | Fujita | ............ | 192/70.23 |
| 6,375,588 B1 | 4/2002 | Frankowski et al. | | |
| 6,422,962 B1 | 7/2002 | Lehtovaara et al. | | |
| 6,478,118 B2 | 11/2002 | Astrom et al. | | |
| 6,554,318 B2 | 4/2003 | Kohut et al. | | |
| 6,575,860 B2 * | 6/2003 | Dutil | ............ | 474/135 |

(Continued)

FOREIGN PATENT DOCUMENTS

WO    WO2004109247 A2    12/2004

*Primary Examiner* — Robert Siconolfi
*Assistant Examiner* — James Hsiao
(74) *Attorney, Agent, or Firm* — Thompson Hine LLP

(57) ABSTRACT

A new asymmetrically damped tensioner is provided utilizing a bearing-ramp clutch. During normal operation, the bearing-ramp clutch enables the tensioner arm to pivot in a first direction to take up belt slack with negligible frictional damping applied to the motion of the tensioner arm. When the tensioner arm pivots in a second direction, away from the belt, however, in a condition commonly known as wind-up, the bearing-ramp clutch locks against a fixed internal surface and creates a frictional damping force that is applied to the tensioner arm. This frictional linkage provides asymmetric frictional damping to the tensioner to limit movement in the second direction to mitigate wind-up.

20 Claims, 5 Drawing Sheets

U.S. PATENT DOCUMENTS

| | | |
|---|---|---|
| 6,655,516 B2 * | 12/2003 | Nakamura et al. ............. 192/45 |
| 6,834,631 B1 | 12/2004 | Blackburn et al. |
| 6,861,765 B2 * | 3/2005 | Taniguchi ................. 290/40 R |
| 6,932,731 B2 * | 8/2005 | Kaiser et al. ................. 474/135 |
| 7,004,865 B2 * | 2/2006 | Berndt et al. ................. 474/135 |
| 7,371,199 B2 * | 5/2008 | Joslyn ........................... 474/135 |
| 2002/0119850 A1 * | 8/2002 | Dutil ............................ 474/135 |
| 2003/0008739 A1 | 1/2003 | Asbeck et al. |
| 2003/0119616 A1 * | 6/2003 | Meckstroth et al. .......... 474/135 |
| 2003/0153421 A1 | 8/2003 | Liu |
| 2004/0072643 A1 * | 4/2004 | Berndt et al. ................. 474/135 |
| 2005/0059518 A1 * | 3/2005 | Joslyn ........................... 474/135 |
| 2005/0184184 A1 * | 8/2005 | Kohlndorfer et al. ......... 242/374 |
| 2005/0199462 A1 * | 9/2005 | Gamache ..................... 192/12 B |

* cited by examiner

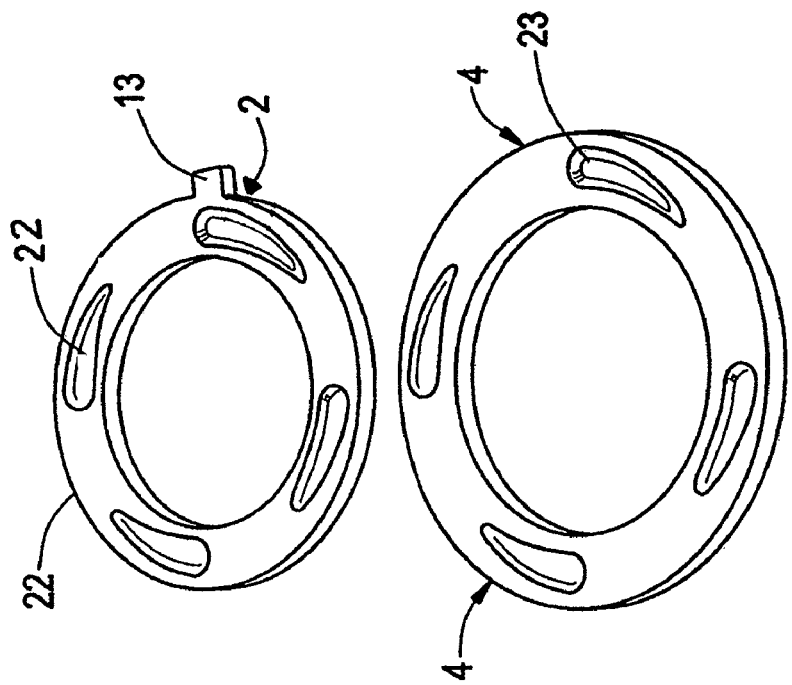
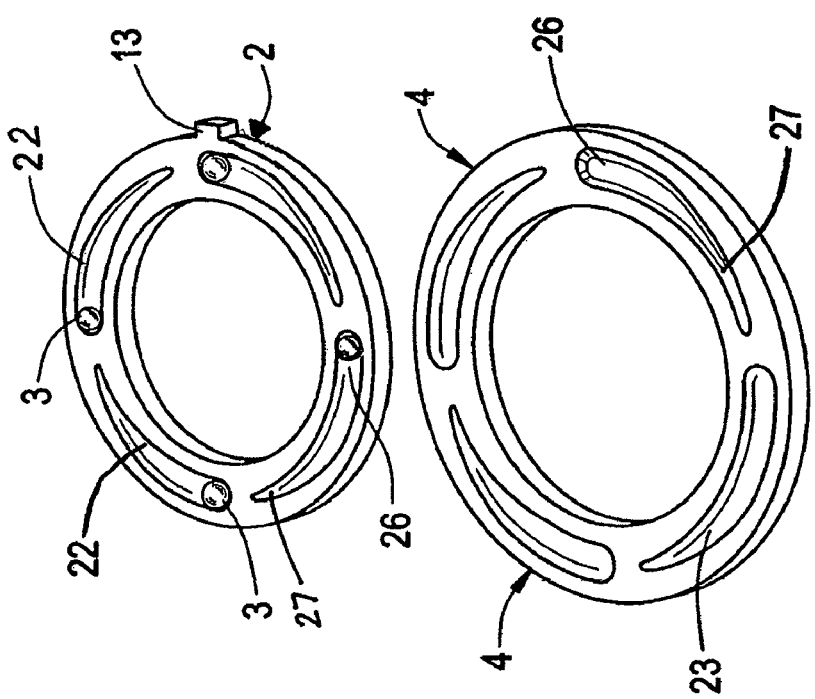

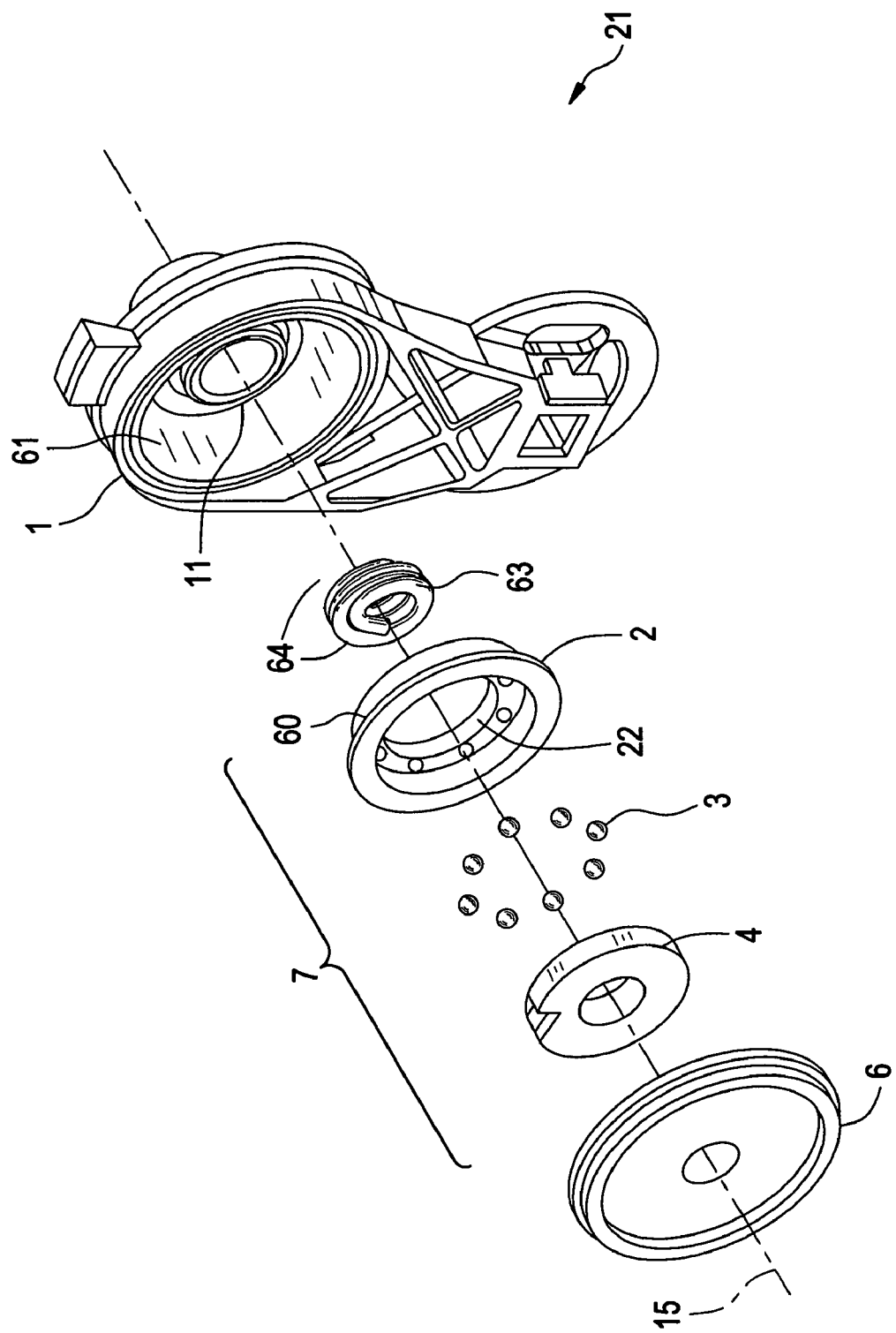

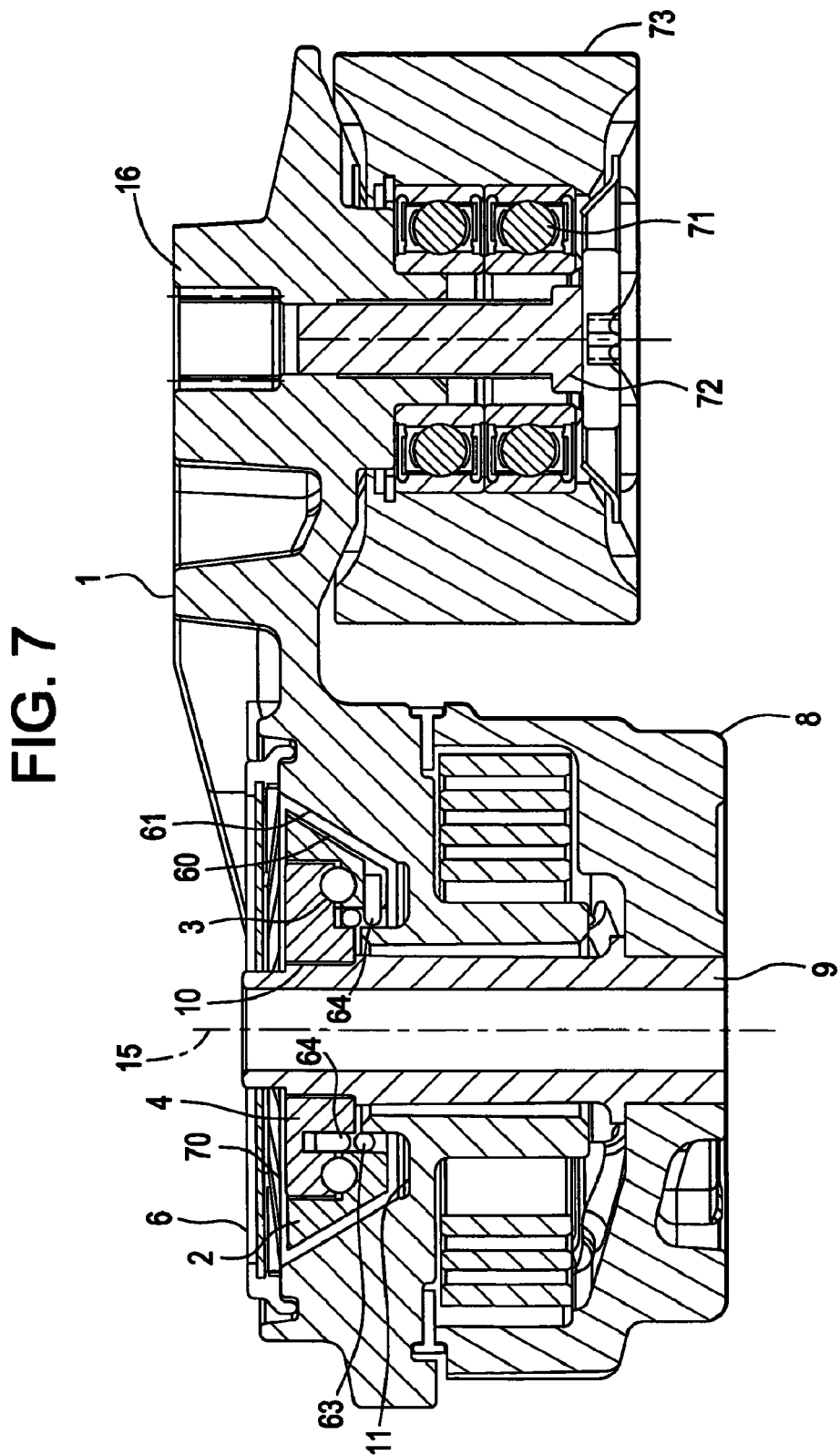

ONE-WAY CLUTCHED DAMPER FOR AUTOMATIC BELT TENSIONER

TECHNICAL FIELD

The present invention relates generally to tensioners and more particularly to an asymmetrically damped tensioner utilizing a bearing-ramp plate clutch operatively engaged with the tensioner arm.

BACKGROUND

It is common for a belt tensioner to have a means to dampen movement of the tensioner arm caused by belt tension fluctuation. The required magnitude of this damping depends on many drive factors including geometry, accessory loads, accessory inertia, engine duty cycle and others. For instance, drive systems that have higher torsional input or certain transient dynamic conditions may require higher damping to sufficiently control tensioner movement. Although higher damping is very effective at controlling arm movement, it can also be detrimental to other critical tensioner functions (e.g. slow or no response to slack belt conditions). In addition, variation or change in damping that occur as a result of manufacturing variation, operating temperature and component break-in or wear can also cause the tensioner to be unresponsive.

Timing belt systems have benefited from the use of asymmetric damping to address this problem. An asymmetrically damped tensioner provides damping when additional belt tension is encountered, but is free to respond to slack belt conditions. Although asymmetric functionality may not be required for all other front end accessory drive tensioners, the potential for increased service life, solving other transient dynamic system problems including belt slip during a 1-2 gear shift, or simply making the tensioner less sensitive to damping variation make it a desirable design option.

One current solution to this problem uses a viscous linear damper mechanism, such as a shock absorber, attached to a pivoting arm. Asymmetric damping is achieved through, for example, check valves and different orifice sizes in the shock absorber. This solution, however, tends to be expensive and requires more packaging space than a conventional tensioner. Other solutions use wedges that increase damper friction during wind-up or spring loaded self-energizing brake shoe elements. These designs, however, tend to be complex with many small parts to assemble.

One-way clutch mechanisms have been proposed, for example in U.S. Pat. Nos. 4,583,962 and 6,422,962, for timing belt tensioners for the purpose of preventing or limiting back travel to prevent tooth jump. These "ratcheting" tensioners, however, lack the ability to relieve belt tension sufficiently when not required. Other timing belt tensioner proposals including, for example, U.S. Pat. Nos. 4,832,665 and 6,375,588, use a one-way device coupled to a viscous damper. Although these devices offer good functionality, retention of the viscous fluid throughout the service life can be difficult. Yet another design disclosed in U.S. Patent App. Publication 2003/0008739, uses friction generated by the clamping action of a wrap spring clutch to provide damping.

The aforementioned tensioner designs are not ideal. Accordingly, a new tensioner design is desired.

BRIEF DESCRIPTION OF THE DRAWINGS

FIGS. 2A and 2B show details of two embodiments of the bearing-ramp plate clutch.

FIG. 6 is an exploded perspective view of a new tensioner according to another embodiment with an angled bearing-ramp plate clutch.

FIG. 7 is a cut away view of a new tensioner according to another embodiment with an angled bearing-ramp plate clutch.

DETAILED DESCRIPTION

The new tensioner disclosed herein uses a one-way, bearing-ramp clutch that produces asymmetric friction such that substantial frictional damping is applied to the tensioner only during wind-up (i.e. untensioning). Wind-up results when increasing belt tension causes the belt to lift the tensioner arm in a direction away from the belt. The present invention resists wind-up with a frictional damping force but does not substantially resist movement of the tensioner arm toward the belt with the same frictional damping force. This characteristic is generally known as asymmetric damping.

Figure 1:
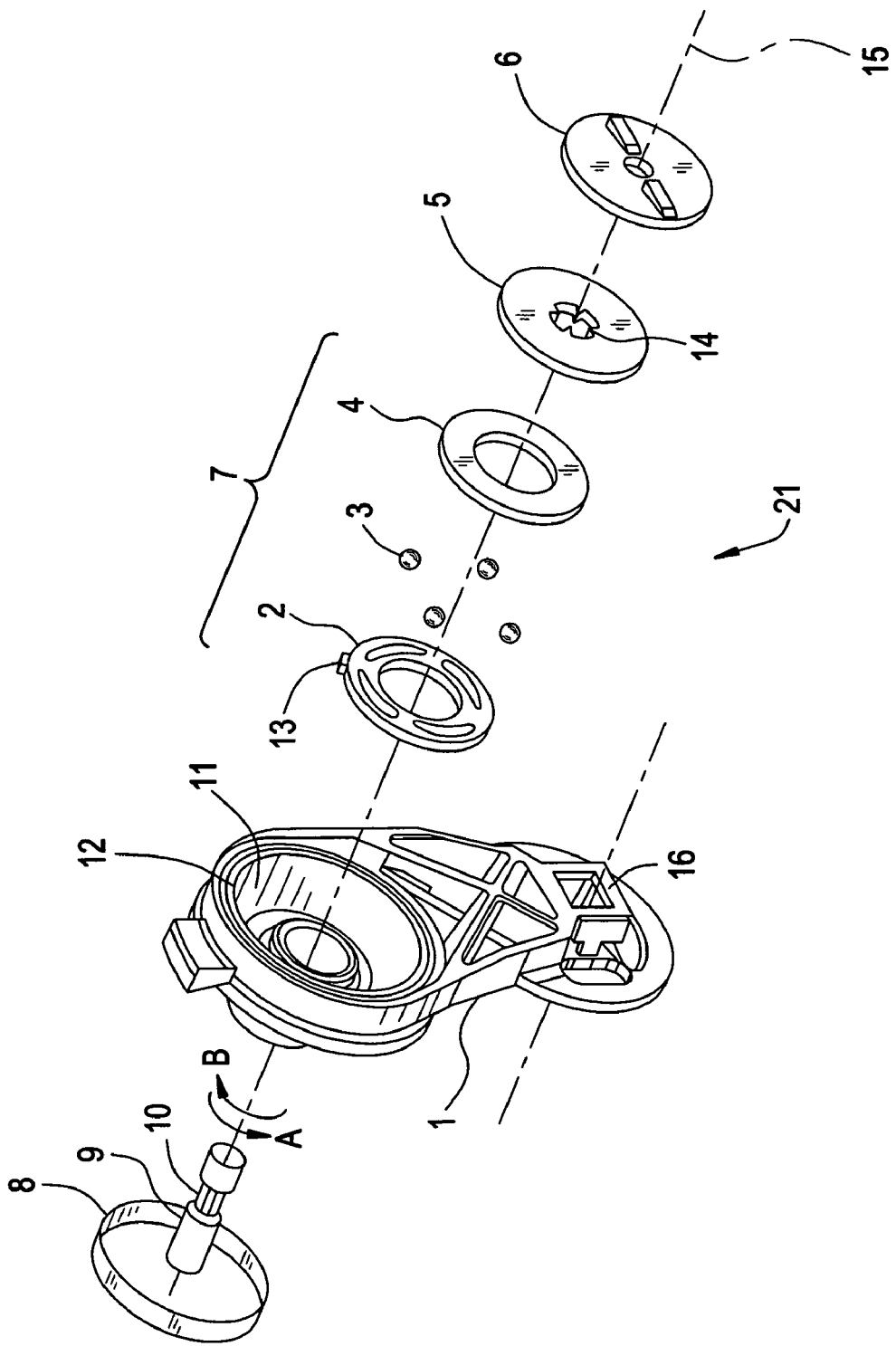
FIG. 1 is an exploded perspective view of one embodiment of a new tensioner with a bearing-ramp plate clutch.

Referring now to the embodiment depicted in FIG. 1, the tensioner 21 herein achieves asymmetric damping in part, by the use of a bearing-ramp clutch 7 that connects the tensioner arm 1 to a brake plate 5. During normal operation, the bearing-ramp clutch 7 is not engaged and the tensioner 21 is biased normally using a spring. During wind-up, the bearing-ramp clutch 7 which is linked to the tensioner arm 1, expands in size and locks to increase the normal force applied by the bearing-ramp clutch 7 to the brake plate 5, thereby increasing the frictional damping force and resisting the movement of the tensioner arm 1 away from the belt. Due to the frictional nature of the asymmetric damping, the tensioner 21 will also respond to high belt tension once the frictional force of the damper is overcome, i.e., the tensioner 21 will not restrict all motion in the wind-up direction regardless of the belt tension.

The tensioner 21 includes a tensioner arm 1 and a bearing-ramp clutch 7. The bearing-ramp clutch 7 is comprised of three primary elements, a rotating bearing plate 2, bearings 3, and a brake bearing plate 4. The brake bearing plate 4 is in frictional contact with the brake plate 5. The interactions between the roller clutch 7 and the brake plate 5 produces the frictional force that generates the asymmetric damping for the tensioner arm 1.

The tensioner arm 1 is pivotable in a first direction A and a second direction B about a pivot axis 15. As is known in the art, the tensioner arm 1 may be biased by, for example, a torsional spring (not shown) in, for example, the first direction A, to tension an associated power transmitting belt or chain. A pulley (not shown), which is rotatably attached to the distal end 16 of the tensioner arm 1, is thereby brought into engagement with the belt with a force to tension the belt. The tensioner arm 1 shown in this embodiment also has a cup 11 with a substantially channel shaped cut in the wall of the cup 11 to create a locking slot 12 substantially aligned with the pivot axis 15 of the tensioner arm 1.

In the embodiment depicted in FIG. 1, the tensioner 21 further comprises an end cap 6 and tensioner base 8. The tensioner base 8 is mounted to the opposite side of the tensioner arm 1 from the bearing-ramp plate clutch 7. The tensioner base 8 has a tensioner axle 9 emerging from the center of the tensioner base 8. The tensioner axle 9 is substantially parallel the pivot axis 15. Near the distal end of the tensioner axle 9 there is a series of locking teeth 10 oriented substantially along the pivot axis 15. The locking teeth 10 are sized to engage the inner locking teeth 14 located around the center of the brake plate 5. The engagement of the locking teeth 10 with the inner locking teeth 14 substantially prevents the rotation of the brake plate 5 about the pivot axis 15 while substantially allowing the translation of the brake plate 5 along the pivot axis 15. The end cap 6 is affixed to the distal end of the tensioner axle 9 to cover the end of the tensioner 21 and create an axial force along the pivot axis 15 that compresses the bearing-ramp plate clutch 7 against the brake plate 5.

FIG. 2A shows one embodiment of a bearing-ramp clutch 7, comprised of a rotating bearing plate 2, a brake bearing plate 4, and bearings 3. FIG. 2B details another embodiment of the rotating bearing plate 2 and the brake bearing plate 4. In both FIGS. 2A and 2B, the rotating bearing plate 2 has a locking tab 13. The locking tab 13 is sized to engage the locking slot 12 on the tensioner arm 1. When the locking tab 13 is engaged with the locking slot 12, the rotating bearing plate 2 is able to translate along the pivot axis 15 while substantially linking the rotation of the rotating bearing plate 2 to the rotation of the tensioner arm 1 about the pivot axis 15. Although the embodiments shown detail a single locking tab 13, multiple locking tabs may be used to fix the rotation of the rotating bearing plate 2 about the pivot axis 15 to the rotation of the tensioner arm 1. Alternative structures known to those of ordinary skill in the art can be used to achieve similar functionality including, but not limited to, locking teeth, or mating ovoid or rectilinear profiles. In yet other embodiments, described in more detail below, the locking tab 13 is eliminated and instead frictional forces generated at the interface of the rotating bearing plate 2 and the cup 11 of the tensioner arm 1 urge the rotating bearing plate 2 to follow the rotation of the tensioner arm 1.

The two embodiments shown in FIGS. 2A and 2B depict the rotating bearing plate 2 and the brake bearing plate 4 with two different embodiments of the respective bearing raceways 22 and 23. FIG. 2A shows a bearing raceway 22 on the surface of the rotating bearing plate 2 and a mating bearing raceway 23 on the surface of the brake bearing plate 4. The mating bearing raceway 23 is on the opposite side of the brake bearing plate 4 from the brake surface (not shown in FIGS. 2A and 2B). When assembled the bearing raceway 22 and the mating bearing raceway 23 face each other they form a confined space for the roller bearing 3 to travel. Similarly, a second embodiment of the bearing raceway 22 and the mating bearing raceway 23 are shown in FIG. 2B. The width, and depth of the bearing raceway 22 and the mating bearing raceway 23 vary according to the overall arc length. So for example, in the embodiment shown in FIG. 2A, the bearing raceway 22 and the mating bearing raceway 23 are longer than the same structures in the second embodiment in FIG. 2B. The bearing raceway 22 and mating bearing raceway 23 arc length as depicted in FIG. 2A is approximately 80 degrees. While, the bearing raceway 22 and mating bearing raceway 23 arc length as depicted in FIG. 2B is approximately 35 degrees. In addition to the overall arc length, the taper, and both the depth and width of the bearing raceway 22 and mating bearing raceway 23 relative to the arc length traveled varies. The changing arc length and taper increases the rate of separation between the rotating bearing plate 2 and the brake bearing plate 4 increases as the roller bearing 3 travels within the space formed between the bearing raceway 22 and the mating bearing raceway 23.

The arc length and taper directly effects how much wind-up is necessary for the bearing-ramp clutch 7 to expand and increase the frictional force generated between the brake bearing plate 4 and the brake plate 5 and effectively lock thereby transferring the frictional forces to the tensioner arm 1. Adjusting the rate of taper of the bearing raceway 22 and the mating bearing raceway 23 thus effectively adjusts the rate of application of asymmetric frictional damping applied to the tensioner 21 during wind-up. The bearing raceway 22 and mating bearing raceway 23 shown in FIG. 2A in the first embodiment, has a relatively shallower slope; meaning the rate of change of the position of the bearing 3 changes more slowly than in the case of a shorter arc length bearing raceway 22 and mating bearing raceway 23 shown in the second embodiment in FIG. 2B. The shorter arc length of the second embodiment, shown in FIG. 2B, means that for a given displacement of the tensioner arm 1 away from the belt being tensioned, the rotating bearing plate 2 and brake bearing plate 4 will separate further than the first embodiment shown in FIG. 2A. The resulting increase in separation increases the frictional damping applied to the tensioner 21 to prevent wind-up.

The total number of bearings 3 and bearing raceways 22 and mating bearing raceways 23 (collectively, raceways) are determined by the length of the raceways, the taper of the raceways, the size of the bearings 3. The number of bearings 3 is also dictated by the need for the bearing 3 elements to adequately support and separate the rotating bearing plate 2 and the brake bearing plate 4. The smallest number of bearing 3 elements for the design is three, and the maximum number is dictated by the size of the bearings 3 and the length and taper of the raceways necessary to achieve a specific damping profile. In the case of the two embodiments shown in FIGS. 2A and 2B, the total number of raceways and bearing 3 elements is four. The bearings 3 and raceways are equally distributed along the circumference of the rotating bearing plate 2 and the brake bearing plate 4. Although the embodiments have all of the bearing elements oriented along a single arc line, it is possible to orient the bearings 3 and the raceways in multiple arc lines so they are effectively staggered along the circumference of the bearing-ramp clutch 7.

Figure 3:
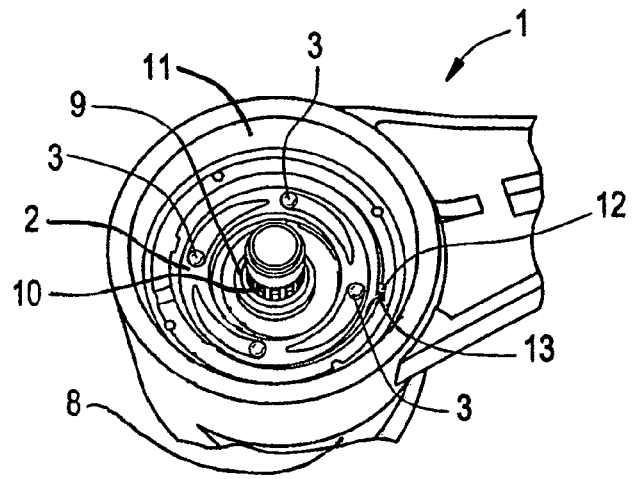
FIG. 3 is a view of a partial assembly of the bearing-ramp plate clutch within a tensioner arm.

A partial assembly of the bearing-ramp plate clutch 7 with a tensioner arm 1 is shown in FIG. 3. The tensioner arm 1 is shown with the tensioner cup 11 facing upward. A rotating bearing plate 2 is inserted into, and sits in the base of the tensioner cup 11. The locking tab 13 slides into the locking slot 12 on the interior surface of, the tensioner cup 11. Four bearings 3 are placed in the bearing raceway 22 in the deepest portion of the bearing raceway 22 or the free running position. The base cap 8 is installed in the opposite side of the tensioner arm 1 and the base cap axle 9 and the base cap locking teeth 10 are protruding from the center of the tensioner cup 11. The tensioner arm 1 rotates along the pivot axis 15 about the base cap axle 9. The rotating bearing plate 2 is rotationally coupled to, and rotates with, the tensioner arm 1.

Figure 4:
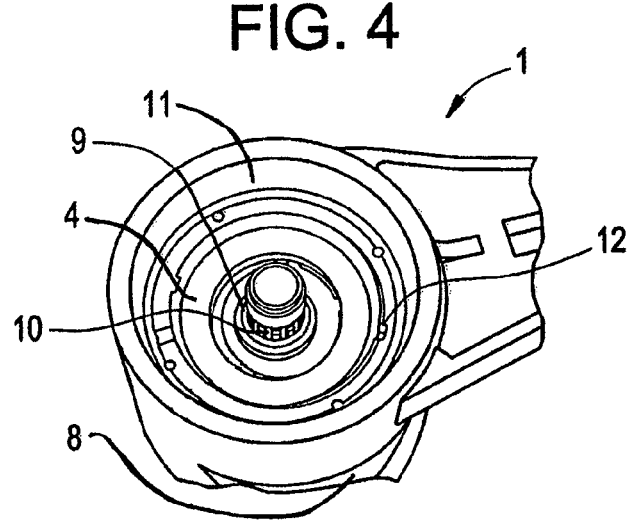
FIG. 4 details the assembled bearing-ramp plate clutch within a tensioner arm.

FIG. 4 is an isometric view of another step in an exemplary assembly process whereby the bearing-ramp clutch 7 is now fully assembled inside the tensioner cup 11. The frictional face or brake surface of the brake bearing plate 4 is shown facing outward, thereby completing the assembly of the bearing-ramp clutch 7. The opposite side of the brake bearing plate 4 has the mating bearing raceway 23 that is aligned with the bearing raceway 22 with the bearing 3 substantially constrained within. The assembly of the embodiment shown in FIG. 4 has an assembled bearing-ramp clutch 7.

Figure 5:
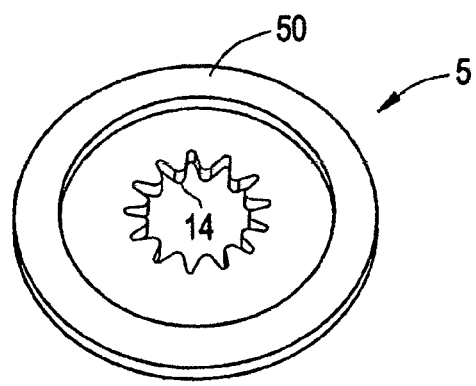
FIG. 5 highlights specific features of one embodiment of a brake plate.

The brake plate 5 is detailed in FIG. 5. The brake plate 5 has a series of inner locking teeth 14. The inner locking teeth 14 are sized to intermesh with the base cap axle locking teeth 10. A brake material 50 is located on the periphery of the brake plate 5. The brake material engages with the mating surface of the brake bearing plate 4 when assembled inside the tensioner arm 1. The mating frictional interfaces on the brake plate 5 and the brake bearing plate 4 may take many forms other than the flat face to flat face embodiment depicted. Some examples of alternative physical forms for the mating frictional interface between the brake plate 5 and the brake bearing plate 4 include a cup and cone or ball and socket configuration to maximize surface area, discrete brake pads, and other combinations for creating a surface suitable for a friction interface between the elements to provide frictional damping to the tensioner 21. The frictional surface itself can be fabricated with numerous processes such as heat and surface treatments, surface etching, and processing coupled with material selection in order to control the friction properties of the interface. In the alternative, a dissimilar frictional surface with the desired friction properties is adhered, bonded, glued, welded, or otherwise affixed to the surface. The various techniques for creating effective friction contacts between parts such as these may be selected by those of ordinary skill in the art.

Although the particular embodiments shown in the figures depict the use of roller ball bearings, many different types of bearings may be utilized, including, for example, ball, taper, needle, roller, and cylindrical bearings. Additionally, the various components of the bearing-ramp clutch 7 can be fabricated in either fewer or greater numbers of elements. Regardless of the physical structure selected, the bearing-ramp clutch 7 uses a rolling bearing element, bearing 3, and the interaction between the rolling bearing element inside the bearing-ramp clutch 7 assembly to enable free movement of the tensioner in the tensioning direction and to enable frictional locking during a wind-up condition typified by rotation in the opposite direction. The rolling bearing element is guided by the bearing raceway 22 and the mating bearing raceway 23 and is substantially retained within the bearing-ramp clutch 7 by the rotating bearing plate 2 and the brake bearing plate 4.

An end cap 6 encloses the tensioner 21, as shown in FIG. 1. The end cap 6 encloses the bearing-ramp clutch 7 and provides a compressive force oriented along the pivot axis 15 to the assembly that keeps individual elements of the assembly under compression. The end cap 6 is mounted to the end of the base cap axle 9 and stays substantially fixed relative to the motion of the tensioner arm 1. The end cap 6 may have an o-ring (not shown) around either or both the external edge and center hole of the end cap 6 to protect the internal elements of the tensioner 21 from dust and dirt and optionally to provide a barrier to prevent the escape of lubricant from inside the tensioner 21.

If the wind-up forces become large enough to overcome the asymmetric frictional damping generated by the interaction between the brake bearing plate 4 and the brake plate 5, the tensioner arm can still break free and rotate by overcoming the static friction at that interface. In this manner, the tensioner is protected against potential damage to the mechanism caused by extreme wind-up conditions while still providing asymmetric damping suitable to manage normal wind-up experienced during normal engine operation. The selection of the mating friction surfaces on the brake plate 5 and the brake bearing plate 4, including the bearing-ramp clutch 7 design itself, provide the designer with control over the amount of force necessary to overcome the frictional damping.

Through the selection of the mating friction surfaces, the type of bearing 3 used, and the configuration of the bearing raceway 22 and mating bearing raceway 23, the designer can control the relationship between amount of asymmetric friction applied to the tensioner arm 1 relative to the amount of wind-up experienced. For example, for more aggressive damping, a shorter, more steeply tapering bearing raceway 22 and mating bearing raceway 23 can be used. The shorter, more steeply tapering raceways causes a given change in the position of the tensioner arm 1 to result in a greater displacement of the bearing 3 for a given rotation of the tensioner arm 1 in the direction of wind-up, direction B. The greater displacement moves the rotating bearing plate 2 and the brake bearing plate 4 apart at a faster rate, thereby increasing the normal force applied to the friction surface between the brake bearing plate 4 and the brake plate 5. The increase in the rate that the normal force is applied to the friction surface for a given change in tensioner arm 1 position, means an increasing rate of asymmetric damping applied to the tensioner arm 1 during wind-up to combat wind-up.

A perspective exploded view of a second embodiment of the bearing-ramp clutch 7 in a tensioner 21 is shown in FIG. 6. The tensioner cup 11 in the second embodiment is formed with a cup-shaped surface 61. The rotating bearing plate 2 in the second embodiment has a cone-shaped surface 60. The cone-shaped surface 60 is sized to mate with the cup-shaped surface 61. The cone-shaped surface 60 and the cup-shaped surface 61 are friction surfaces that together form a second mating frictional interface between the tensioner arm 1 and the rotating bearing plate 2. The frictional link causes the rotating bearing plate 2 to move in substantially direction and in substantially the same amount as the tensioner arm 1. The second embodiment shown in FIG. 6 utilizes the second mating frictional interface instead of an interlocking slot and tab to rotationally link the rotating bearing plate 2 with the tensioner arm 1.

Inside the rotating bearing plate 2, bearings 3 are located in contact with bearing raceways 22. The bearing raceways 22 are fabricated on the interior surface of the rotating bearing plate 2. The bearings 3 are captured by the brake bearing plate 4, which has mating bearing raceway 23 (not shown). A torsional spring 63 links the rotating bearing plate 2 with the brake bearing plate 4 such that a rotation of the rotating bearing plate 2 manifests itself as a rotational urge applied to the brake bearing plate 4. The rotating bearing plate 2 and brake bearing plate 4 with the bearings 3 and the torsion spring 63 form the bearing-ramp clutch 7 assembly of the second embodiment.

In the second embodiment, the function of the brake plate 5 is replaced by the end cap 6. The end cap 6 is fixed to the pivot axis 15 so it cannot rotate. A portion of the surface of the end cap 6, shown in FIG. 7, facing the tensioner arm 1 is a friction surface 70 that interfaces with a friction surface on the brake bearing plate 4. The mating frictional interfaces on the end cap 6 and the brake bearing plate 4 form a frictional linkage between the bearing-ramp clutch 7 and the fixed end cap 6. In an alternative embodiment, the brake plate 5, as described above, is substantially unable to rotate about the base cap axle 9 (not shown in FIG. 6) is used between the bearing-ramp clutch 7 assembly. Regardless of whether or not a brake plate 5 is used in the embodiment, the mating frictional interfaces create a frictional linkage between the bearing-ramp clutch 7 and a substantially fixed surface.

Operationally, the tensioner 21 of the second embodiment operates in a similar manner to the first embodiment. When the bearing-ramp clutch 7 is urged due to wind-up of the tensioner arm 21, (i.e. direction B), the bearings 3 are urged away from the deeper portion of the bearing raceway 22 and mating bearing raceway 23, the rotating bearing plate 2 and the brake bearing plate 4 are urged apart. When the respective plates (2 and 4) are urged apart the greater normal force applied to the mating frictional interface and the second mating frictional interface increases the frictional force applied to the damper and thus results in increased asymmetric damping. Similarly, when the tensioner arm 1 is moving in toward the belt (i.e. direction A), the bearings 3 are urged toward the deeper portion of the bearing raceway 22 and the mating bearing raceway 23. The movement of the bearings 3 into the deeper portion reduces the distance separating the rotating bearing plate 2 and the brake bearing plate 4. The reduction in distance thus reduces the normal force applied to the mating friction surface and second mating friction surface thereby reducing the friction applied to the tensioner arm 1 as it moves toward the belt (direction A).

In the second embodiment shown in FIGS. 6 and 7, a torsional spring 63 creates a rotational linkage between the rotating bearing plate 2 and the brake bearing plate 4. The torsional spring 63 has a pair of tangs 64 at each end of the spring. In the sectional view of the embodiment of the tensioner shown in FIG. 7, the tangs 64 of the torsional spring 63 interface with the rotating bearing plate 2 and the brake bearing plate 4 respectively. The torsional spring 63 creates a rotational linkage that couples movement of the rotating bearing plate 2 through the torsional spring to cause a corresponding movement of the brake bearing plate 4. The rotating bearing plate 2 rotates due to the frictional interface of the cup shaped surface 60 of the rotating bearing plate with the cone-shaped surface 61 on the tensioner arm 1.

Other features depicted in the cut-away of the embodiment shown in FIG. 7 include the tensioner pulley 73 located at the distal end 16 of the tensioner 1 that applies a force generated by the tensioner 1 to the belt under tension (not shown). The tensioner pulley 73 rotates on tensioner bearings 71 to minimize friction. The tensioner pulley 73 and tensioner bearings 71 rotate about the tensioner axle 72.

Similar to the first embodiment of the tensioner 21, the second embodiment depicted has friction surface that enable the tensioner arm 1 to tolerate extreme wind-up excursions without damaging the tensioner 21 or its internal components. Specifically, the mating friction surface and second mating friction surface enable the tensioner arm 1 to overcome the asymmetric friction damping and continue to rotate in the event of extreme wind-up it it overcomes the frictional damping created by the bearing-ramp clutch 7. The second embodiment has a second mating friction surface between the tensioner arm 1, and the cup-shaped surface 60 inside the cup 11 that interfaces with the rotating bearing plate 2 in addition to the mating friction surface created by the brake bearing plate 4. The mating friction surface and second mating friction surface can be tailored to work together and selectively give in a way that minimizes the chance to damage to the tensioner 21 during extreme wind-up conditions.

The bearing-ramp clutch 7 enables the tensioner 21 to assume two primary operating states, a brake or damping state and a rotate state. As shown in FIG. 2A, the bearing raceway 22 and the mating bearing raceway 23 provide a deeper portion 26 and a tapering portion 27 of the bearing raceway 22 and mating bearing raceway 23. The deeper portion 26 is configured to hold the bearing 3 during normal tensioning of the belt. During normal belt tensioning it is desirable to apply a majority of the spring force to the belt under tension with a minimal amount of friction generated by the bearing-ramp clutch 7. During normal belt tensioning, the spring, not shown in the figures, provides a preload to the tensioner arm 1 thereby urging the tensioner arm 1 toward the belt in direction A. As the tensioner arm 1 moves in direction A, the rotating bearing plate 2 rotates along with the tensioner arm 1. The rotation of the rotating bearing plate 2 in direction A urges the bearing 3 into the deeper portion 26 of the rotating bearing plate 2 and the brake bearing plate 4. When the bearing 3 is located in the deeper portion 26, the rotating bearing plate 2 and the brake bearing plate 4 are the closest together and occupy the least amount of volume inside the space defined along the pivot axis 15 between the end cap 6 and the inside of the tensioner cup 11. In other words, the distance between the rotating bearing plate 2 and the brake bearing plate 4 is minimized. Since the space occupied by the bearing-ramp clutch 7 is at a minimum, the normal force applied to mating frictional interface is minimized. The brake bearing plate 4 forms the mating frictional interface with either the frictional surface on the brake plate 5, or the end cap 6. With the minimal normal force at the frictional contact, the amount of frictional damping generated by the bearing-ramp clutch 7 is at a minimum and it is in a rotate state.

The second operating state for the bearing-ramp clutch 7 is the braking state. This condition occurs during tensioner 21 wind-up, when the tensioner arm 1 is pivoting away from the belt being tensioned. As the tensioner arm 1 rotates in direction B, the rotating bearing plate 2 is urged in direction B due to the linkage between the rotating bearing plate 2 and the tensioner arm 1. The rotation of the rotating bearing plate 2, as a result of the movement of the tensioner arm 1 from a backlash state, urges the bearings 3 along the bearing raceway 22 and mating bearing raceway 23 away from the deeper portion 26 along the tapering portion 27. The resulting movement of the bearings 3 into the tapering portion 27, forces the rotating bearing plate 2 and the brake bearing plate 4 apart from each other. As a result of the movement, overall space occupied by the roller plate clutch 7 increases and the brake bearing plate 4 is urged into the brake plate 5. Movement along the pivot axis 15 of the brake plate 5 is constrained by the end cap 6 and the movement along the pivot axis 15 of the rotating bearing plate 2 is contained by the tensioner cup 11. Therefore, the increasing separation of the rotating bearing plate 2 and the brake bearing plate 4 increases the normal force applied to the mating frictional interface formed by the brake bearing plate 4 and either the brake plate 5 or the end cap 6. The increasing normal force at the mating frictional interface increases the frictional damping. Further, the increasing separation of the rotating bearing plate 2 and the brake bearing plate 4 impedes the movement of the bearing 3 inside the bearing raceway 22 and the mating bearing raceway 23 that effectively locks the rotation of the rotating bearing plate 2 to the brake bearing plate 4. The effective locking action allows the frictional force generated at the mating frictional interface between the brake bearing plate 4 and the brake plate 5 or the end cap 6 to be transferred to the tensioner arm 1 thereby creating the asymmetric frictional damping needed to resist wind-up of the tensioner 21.

The embodiments described herein include a number of frictional surfaces that are used to create asymmetric damping and effectively brake and/or link the various elements of the tensioner 21. Regardless of position, the frictional surfaces can take a number of alternative forms within the structure of the overall embodiment including, a cup and cone or ball and socket configuration to maximize surface area, discrete brake pads, and other combinations for creating a surface suitable for a friction interface between the elements to provide frictional damping to the tensioner. The frictional surface itself can be fabricated with numerous processes such as heat and surface treatments, surface etching, and processing coupled with material selection in order to control the friction properties of the interface or a dissimilar frictional surface that is adhered to the surface. The various techniques for creating effective friction contacts between parts such as these may be selected by those of ordinary skill in the art.

The embodiments of this invention shown in the drawings and described above are exemplary of numerous embodiments that may be made within the scope of the appended claims. It is contemplated that numerous other configurations of the tensioner assemblies may be created taking advantage of the disclosed approaches. In short, it is the applicant's intention that the scope of the patent issuing herefrom be limited only by the scope of the appended claims.

What is claimed is:

1. A tensioner comprising:
    an arm pivotable about a pivot axis in a first direction and a second direction and translatably fixed about the pivot axis;
    a rotating bearing plate coupled to the arm, the rotating bearing plate being rotatable with the arm and translatable along the pivot axis relative to the arm, the rotating bearing plate comprising a first face, a second face, and a periphery;
    a bearing in contact with the second face of the rotating bearing plate; and
    a brake bearing plate comprising a friction face and a bearing face, the bearing face being in contact with the bearing, the brake bearing plate being translatable along the pivot axis relative to the arm;
    wherein the bearing is retained between the rotating bearing plate and the brake bearing plate in a first position;
    wherein rotation of the rotating bearing plate during wind-up moves the bearing to a second position that translates both the rotating bearing plate and the brake bearing plate along the pivot axis away from one another to increase frictional damping force acting on the arm.

2. A tensioner as claimed in claim 1, further comprising a brake plate that is substantially rotationally fixed relative to the first direction and the second direction and is in contact with the friction face of the brake bearing plate.

3. A tensioner as claimed in claim 1, further comprising an end cap that is substantially fixed to a point on the pivot axis and is in contact with the friction face of the brake bearing plate.

4. A tensioner as claimed in claim 1, further comprising a tab on the periphery of the rotating bearing plate.

5. A tensioner as claimed in claim 4, whereby the rotating bearing plate is coupled to the arm by the tab.

6. A tensioner as claimed in claim 1, wherein the bearing is selected from the group comprised of roller bearing, tapered bearing, and ball bearing.

7. A tensioner as claimed in claim 1, wherein during wind-up the rotating bearing plate rotates relative to the brake bearing plate, which urges the bearing to move from the first position to the second position to increase the distance between the rotating bearing plate and the brake bearing plate, wherein the first face of the rotating bearing plate engages with the arm with a force to dampen the movement of the arm.

8. A tensioner as claimed in claim 1, wherein the second face of the rotating bearing plate further comprises a bearing raceway and the bearing face of the brake bearing plate further comprises a mating bearing raceway, wherein the bearing raceway and the mating-bearing raceway are configured to substantially retain the bearing.

9. A tensioner as claimed in claim 8, whereby the bearing raceway and the mating bearing raceway each further comprise a deeper portion and a tapered portion.

10. A tensioner as claimed in claim 8, whereby the first face of the rotating bearing plate is in contact with said arm to couple the rotation of the rotating bearing plate to the pivoting of the arm.

11. A tensioner as claimed in claim 1, further comprising a torsional spring linking the rotation of the rotating bearing plate to the brake bearing plate for rotation therewith.

12. A tensioner comprising:
    an arm pivotable about a pivot axis in a first direction and a second direction and translatably fixed about the pivot axis;
    a rotating bearing plate pivotable about said pivot axis with the arm and translatable along said pivot axis relative to the arm, the rotating bearing plate comprising a first face and a second face;
    a bearing in contact with the second face of the rotating bearing plate;
    a brake bearing plate pivotable about the pivot axis and translatable along the pivot axis, the brake bearing plate comprising a brake face and opposite thereof a bearing face, the bearing face being in contact with the bearing; and
    a brake plate rotatably fixed to the pivot axis, the brake plate comprising a friction face in frictional contact with the brake face of the brake bearing plate;
    wherein rotation of the rotating bearing plate during wind-up translates the brake bearing plate into increased frictional contact with the brake plate for asymmetric damping of the arm.

13. A tensioner of claim 12, wherein the second face of the rotating bearing plate further comprises a bearing raceway and the bearing face of the brake bearing plate further comprises a mating bearing raceway, and the bearing is constrained by the bearing raceway and the mating bearing raceway.

14. A tensioner of claim 13, wherein the bearing raceway and the mating bearing raceway are located in the four quadrants of the circumference of the respective rotating bearing plate and the brake bearing plate, and are between about 35 degrees and about 80 degrees arc length.

15. A tensioner of claim 12, wherein during wind-up the arm rotates the rotating bearing plate relative to the brake bearing plate, and urges the bearing to increase the distance between the rotating bearing plate and the brake bearing plate, wherein the first face of the rotating bearing plate engages with the arm with a force to dampen the movement of the arm.

16. A tensioner of claim 12, wherein said rotating bearing plate further comprises a tab and the arm further comprises a slot substantially aligned with the pivot axis, adapted to accept the tab, wherein the tab substantially fixes the rotating bearing plate to pivot in the first direction and the second direction with the arm while allowing the rotating bearing plate to be substantially free to translate along the pivot axis.

17. A tensioner comprising:
    a base cap with an axle;
    an arm comprising a cup centered on the axle, the arm being pivotable about said axle in a first direction and a second direction and being translatably fixed about the axle;
    a rotating bearing plate that rotates about and translates along the axle, wherein the rotating bearing plate is housed in the cup of the arm and is rotatably connected to the arm for rotation therewith, the rotating bearing plate comprising a first face and a second face;
    a bearing in contact with the second face;

a brake bearing plate that rotates about and translates along the axle, the brake bearing plate comprising a friction face and opposite thereof a bearing face, the bearing face being in contact with the bearing; and a brake plate substantially rotationally fixed to the axle, the brake plate being in frictional contact with the friction face of the brake bearing plate;

wherein rotation of the rotating bearing plate during wind-up translates the brake bearing plate into increased frictional contact with the brake plate for asymmetric damping of the arm.

18. A tensioner of claim 17, further comprising a bearing raceway formed in the second face of the rotating bearing plate and a mating bearing raceway formed in the bearing face of the brake bearing plate, wherein the bearing raceway and the mating bearing raceway are sized to accommodate the bearing.

19. A tensioner of claim 17, wherein said cup further comprises a slot substantially oriented along said axle and said rotating bearing plate further comprises a tab on the periphery of said rotating bearing plate whereby said tab is sized to fit within said slot and rotatably connect said rotating bearing plate to said arm.

20. A tensioner of claim 19, where a rotation of the arm in a second direction causes a rotation of the rotating bearing plate in the second direction thereby urging the bearing to translate relative to the brake bearing plate such that the friction face of the brake bearing plate engages the brake plate with a force to dampen the movement of the arm.

* * * * *